Patented Sept. 3, 1946

2,406,741

UNITED STATES PATENT OFFICE 2,406,741

VITAMIN B-COMPLEX TABLET

Walter A. Compton and Richard S. Nicholls, Elkhart, Ind., assignors to Miles Laboratories, Inc., Elkhart, Ind., a corporation of Indiana No Drawing. Application October 5, 1942, Serial No. 460,832

8 Claims. (Cl. 167—81)

This invention relates to a vitamin tablet more particularly to a palatable, stable tablet of the vitamins of the B-complex. It has for its object to provide an effective means for dispensing certain of the vitamins of the B-complex in significant therapeutic amounts in a pleasant and tasty tablet. It has for its further object to provide a means for stabilization of the B-complex vitamins contained therein against decomposition.

The vitamins of the B-complex are a series of water-soluble organic compounds which play a tremendously important role in human nutrition. Chief among these compounds are vitamin $B_1$ (thiamin hydrochloride), vitamin $B_2(G)$ or riboflavin, the pellagra-preventive factor, nicotinamide, vitamin $B_6$ (pyridoxine) and the filtrate factor (calcium pantothenate).

Vitamin $B_1$ (thiamin hydrochloride), is, chemically, 4 - methyl, - 5 - betahydroxyethyl - N - (2' - methyl,6' - aminopyrimidyl,5' - methyl) - thiazolium chloride hydrochloride, a white, crystalline compound readily soluble in water and relatively stable to heat. Thus, the acid solution of thiamin may be heated at 100° C. for 24 hours without diminution of potency. However, the thiamin is rapidly destroyed in alkaline solutions, and the pH of solutions should preferably be below 5.5. This compound is the antineuritic vitamin. An extreme deficiency of this vitamin in the human diet gives rise to beriberi, a condition characterized by muscular atrophy, multiple neuritis, cardiovascular changes, serious effusions and a generalized edema (Williams and Spies, Vitamin $B_1$ and its Use in Medicine, New York, MacMillan, 1938). A moderate deficiency of thiamin in the diet causes a loss of weight and appetite, polyneuritis, impaired intestinal function, gastric atony, impaired reproductive function, failure of lactation, etc. (Sherman and Smith, The Vitamins, New York, Chemical Catalogue Co., of 1931.)

Vitamin $B_2$ (riboflavin) is, chemically 6,7-dimethyl, 9-(d-ribityl) isoalloxazine, an orange-yellow crystalline powder whose acqueous solutions have an intense yellow-green fluorescence. This compound is stable to heat in acid solution but is rapidly destroyed when the solution is more alkaline than pH 7.5. Riboflavin has been known since 1879 as the water-soluble fluorescent pigment of milk which Blyth (J. Chem. Soc. London, 35, 530 of 1879) called lactochrome. The identity of this pigment with vitamin $B_2$ was first established by Kuhn, Gyorgy and Wagner-Jauregg (Berichte, 66, 317, 1034, 1950 of 1933). Riboflavin is an essential constituent of the "yellow enzyme" of Warburg (Biochem. Zeitschr. 254, 438–458 of 1932) and plays a vital, deep-seated role as a component of the catalysts involved in the oxidation-reduction processes of the cell. Deficiency of riboflavin in the human diet leads to visual disturbances, such as blurred vision and photaphobia, dermatitis, loss of hair and a generally lowered state of health. It is also reported as a valuable adjunct to thiamin and nicotinic acid in the treatment of certain cases of pellagra (Spies, Bean and Ash; Ann. Int. Med., 12, 1930 of 1939), and Journ. Amer. Med. Assn., 113, 931, of 1939.

Nicotinamide, the amide of pyridine-3-carboxylic acid, is the pellagra-preventive factor of the B-complex. It is a white, deliquescent crystalline powder very readily soluble in water. In 1937, Elvehjem and coworkers (Journ. Amer. Chem. Soc. 59, 1767 of 1937) demonstrated that nicotinic acid had a specific curative effect on canine blacktongue disease, a condition analogous to pellagra in humans. Since then, the identity of this compound with the pellagra-preventive factor in the B-complex has been established. It is probably the amide rather than the acid that is the active factor in nature. The coenzyme in the human erythrocyte that catalyses the oxidation of glucose-6-phosphate contains nicotinamide (Warburg et al., Biochem. Ziet., 282, 157 of 1935), as does the cozymase of yeast (Euler and Schlenk, Hoppe-Seyl. Zeit., 246, 64 of 1937).

Vitamin $B_6$ (pyridoxine hydrochloride) is, chemically, 2 - methyl,3 - hydroxy,4,5, - di - (hy - droxymethyl) pyridine hydrochloride, a white crystalline compound readily soluble in water. The vitamin is stable in either acid or alkaline solution, but Harris et al. (J. A. C. S. 63 No. 12, 3363-3367) have shown that heating a neutral solution produces a dimer or a trimer as polymerization products and that these polymers do not have the biological potency of the unpolymerized vitamin, the dimer being one-fortieth as potent.

The filtrate factor of the B-complex, calcium pantothenate, is, chemically, the calcium salt of alpha-hydroxy, beta, beta-dimethyl-butyroalanide. It forms a white crystalline moderately hygroscopic powder, readily soluble in water, relatively stable at high temperatures but readily decomposed in alkaline solution. It is very widely distributed in nature, as the name indicates, and is probably essential to all forms of life. Deficiency of pantothenic acid in the diet produces pathological changes in the central nervous system and has important endocrinological effects. More recently, it has been established that pantothenic acid is identical with the so-called "anti-gray hair factor" (Lunde, Kringstad and Jansen, Naturwissenschaften, 29, 62 of 1941) and that its incorporation in adequate amounts in the human diet inhibits the premature graying of hair.

An important problem associated with a tablet product of the vitamins of the B-complex is taste and palatability. Thiamin hydrochloride has a slight yeastlike or nutty taste; riboflavin an intensely bitter taste as also has nicotinamide; the calcium pantothenate and vitamin $B_6$ are relatively tasteless. In a product of the type contemplated in which these vitamins are to be present in therapeutically significant amounts within a single tablet, it is clear that the taste of riboflavin and nicotinamide must be masked if the tablet is to be palatable and readily acceptable to the consumer.

Thiamin hydrochloride is a somewhat unstable substance being destroyed in the presence of reducing agents and/or in an alkaline medium. Riboflavin also is unstable in an alkaline medium. Nicotinamide is of itself a very stable substance, but it has been found that in many tableted compositions containing this vitamin where an excess of an acidic substance has been used to stabilize the thiamin and riboflavin, the nicotinamide tends to revert to nicotinic acid. This reversion is undesirable since nicotinic acid occasions in many people a flushing and tingling of the face, neck and extremities, palpitation of the heart and a severe sense of gastric discomfort, and there is also associated a transient fall of blood pressure. For this reason, it is preferable that nicotinamide when used should remain in the tablet as such and further that nicotinic acid itself be not used in the first place. Furthermore, the vitamin as found in nature, and as appearing in naturally occurring foods, is present as the amide, and hence this is the more desirable form in which to use the vitamin. Calcium pantothenate also is readily decomposed in an alkaline medium.

It is therefore an object of the present invention to make a stable therapeutic tablet of vitamins of the vitamin-B complex by compounding a tablet with vitamins and a base or vehicle for them such that each and all of the vitamins are maintained in stable condition in the presence of each other, whereby the balance of the vitamins is maintained as supplied originally in formulating the tablet, and whereby undesired physiological effects do not result from instability of one or more vitamins.

It is the further object of this invention that the vitamins of the B-complex in such a tablet shall be stable on long standing under varying conditions of temperature and humidity without diminution of the vitamin potency.

It is a further object of the invention to provide a tablet base for vitamins of the B-complex which is essentially a buffering agent and is particularly amphoteric protein having its isoelectric point slightly on the low or acid side of pH of 7.

Heretofore, vitamin B-complex has been provided in various compositions or form, and they have had various disadvantages. For example, capsulation within a gelatin capsule has been used, thus preventing the vitamins from being tasted when swallowed. Also in such a vehicle one may use an excess of some organic acid to provide stability of the thiamin and riboflavin without being concerned by the combination, unfortunate in a palatable sense, of extreme sourness, deriving from the organic acid, and bitterness from the riboflavin and nicotinamide. Children and many adults, however, have a great deal of difficulty in swallowing such capsules. Various liquid preparations have also been devised, but here, since the hydrolysis of the thiamin and of the nicotinamide will take place very readily, the difficulties of meeting the above desiderata are increased unless relatively small concentrations of the vitamins are used. The vitamins in synthetic form have also been tableted together with an organic acid in an inert base so that the pH of the tablet may be kept adequately low to safeguard the thiamin. This also gives the tablet an unpalatable taste since the sourness and bitterness together reinforce each other. Furthermore, in all of these preparations the nicotinamide tends to revert to nicotinic acid which, as pointed out above, is undesirable. It has been found that in preparations where an acid is added to effect stability, the extremely unpleasant combination of a sour bitter taste cannot be masked satisfactorily by the simple expedient of adding a flavoring agent.

The basis of the present invention is the finding that the above objects may be realized by incorporating the vitamins of the B-complex named above in a protein-containing base, providing a buffering substance in the form of amphoteric protein having its isoelectric point below pH of 7, and more specifically in a base of a milk protein-containing substance. It has further been found desirable in using a base of this nature to introduce the vitamins into it in dry form and compress the resultant mixture directly into tablets rather than moistening either the whole composition or the vitamins to produce a granule as an intermediate step in the manufacture of tablets. The process of granulation usually involves the use of heat, and this also is avoided in our process.

Milk proteins are preferred because of their food value and general acceptance by the run of humans, in particular regard to the subject of allergies.

Examples of milk proteins suitable for the above purpose are casein, lactalbumin and lactoglobulin. Examples of milk protein-containing substances suitable for this purpose are dried whole milk powder, dried skimmed milk powder, dried buttermilk powder, etc. Especially suitable for this purpose is the dried buttermilk prepared from the aqueous residue of defatted sweet cream which may be obtained in a fine granular form which lends itself readily to the dry process of vitamin tablet manufacture. Further, this material has a naturally inherent higher vitamin B-complex content especially of the unknown or little known elements of the vitamin B-complex than have the other above mentioned milk products. A further advantage of this milk product over that of the other various milk products described above for use in a preparation of this kind which is designed as a dietary supplement is that the various mineral constituents of milk are present in a readily available form in a proper ratio for administration. While the amounts present are not large and in the ordinary preparation of this type would not constitute a sole necessary adequate intake of these minerals, such materials nonetheless would be more preferable as a vehicle for a dietary supplement than would a physiologically inert material such as frequently is used as a tablet base. An analysis of such a typical dried buttermilk from sweet cream found suitable as a base for these tablets is:

| | Per cent |
|---|---|
| Protein | 31.92 |
| Ash | 7.72 |
| CaO | 1.42 |
| $P_2O_5$ | 2.24 |
| Moisture | 4 |
| Fat | 6.5 |
| Lactose | 48.12 |
| Acid as lactic acid | 1.67 |

30 gamma of riboflavin per gram, 30 gamma of pantothenic acid per gram, 8 to 10 gamma of nicotinic acid per gram.

Small amounts of other less well known or unknown vitamins of the B-complex are also present but methods of analysis are not available for accurate estimation.

We have found that in tablets containing the vitamins of the B-complex in a base as described above, the vitamins are effectively stabilized and on prolonged standing retain their potency. Furthermore, nicotinamide does not revert to nicotinic acid in such a tablet. A milk protein base also masks to a considerable extent the bitter taste of nicotinamide and riboflavin. Further, to increase the palatability of the tablet we have found it advisable to add cocoa powder, sweetening agents such as sucrose and saccharin, and one or more flavoring agents, such as coumarin, which intensify the flavor of the chocolate. The flavoring agents must be chosen with care since those such as vanillin which are reducing agents are incompatible with thiamin. It is to be noted that these present flavoring agents will produce a pleasant tasting product only with a bland substance such as the milk protein referred to above, but would produce a thoroughly unpleasant taste if used when the stabilizing material is only organic acid, as used heretofore.

The minimum daily adult requirements of the more important members of the B-complex are now believed to be of the following order:

| | Mgm. |
|---|---|
| Thiamin | 1 |
| Riboflavin | 2 |
| Nicotinamide | 10 |

Thus the relative molar concentrations of these compounds in a tablet such as contemplated in this invention containing the minimum daily adult requirement would be respectively as 1.0:1.8:27.3. Nicotinamide is, therefore, present in preponderant quantity. The unstability of tablets containing these vitamins may be due to the fact that ncotinamide is very soluble in water and a very small amount of moisture present in a tablet of this nature is sufficient to initiate the hydrolysis of the ncotinamide to ammonium nicotinate over prolonged standing. As this hydrolysis proceeds, the pH of the table would gradually increase until it exceeded pH 7.0. The tablet medium would thus become alkaline and gradual decomposition of the thiamin, riboflavin and calcium pantothenate would take place. It is clear, therefore, that the stability of the other vitamins is partly dependent on the stability of the nicotinamide. The nature of proteins as amphoteric compounds in the presence of water is well known. They are capable of combining with both acids and bases, and as such are powerful buffers. The use of milk protein as a base for our tablet would inhibit any substantial change in pH of the composition even on prolonged standing. The pH of a milk protein substance such as described above is in the neighborhood of 6 to 6.5 and is thus slightly on the acid side. It has been found in this invention that thiamin and riboflavin in a solid composition are stable at this pH range which is held constant by the buffering action of the proteins and that in this nearly neutral medium hydrolysis of nicotinamide, and effects thereof are inhibited, so that it remains substantially as the amide, does not revert to nicotinic acid over a long period of time, and does not lead to instability of the companion vitamins.

As an example of a product of the type discussed above, we may cite the following formula:

| | Grams |
|---|---|
| Thiamin | 6 |
| Riboflavin | 10 |
| Nicotinamide | 50 |
| Vitamin $B_6$ | 1.25 |
| Calcium pantothenate | 5 |
| Cocoa powder | 550 |
| Cane sugar | 550 |
| Dried buttermilk from sweet cream | 830 |
| Saccharin | 1.65 |

In making the tablet the cocoa is first flavored with small amounts of coumarin in alcoholic solution and the alcohol permitted to evaporate. The vitamins are then triturated into the dried buttermilk and the resulting mixture mixed with the cocoa and sugar. The final mixture is then compressed dry into large slugs which are then broken up by forcing them through a coarse screen and the resulting granules compressed into tablets in the usual manner. The weight of the tablets for the above formula would be 0.4 gm. in order to provide the above described minimum daily requirements of thiamin and riboflavin in one tablet. However, it is clear that by reducing the quantities of the vitamins used in the above formula, the said minimum daily requirements of thiamin, riboflavin and nicotinamide may be dispensed in two, three or any number of tablets of the 0.4 gm. size, or in one larger tablet or wafer.

The present invention does not contemplate setting forth as the invention the minimum daily requirements. Even experts may differ on that question. The invention is concerned with combinations of vitamins, as described, rather than with the proportions of them, and with a vehicular tablet base for the combination. Numerous changes and modifications are contemplated as falling within the scope of the invention as set forth in the appended claims.

We claim:

1. A dry tablet of vitamin B-complex, comprising in combination essentially, and in intimate admixture a large quantity of dry buttermilk providing amphoteric protein in the base of the tablet, and small quantities of vitamins of the B-complex including at least one which is unstable in alkaline surroundings and selected from the group consisting of thiamin, riboflavin and a salt of pantothenic acid, and including free nicotinamide which is unstable in a strongly acid medium of a character tending to stabilize said selected vitamin, said protein base by its amphoteric character and buffering action at a pH in the range from 6 to slightly on the lower side of neutral pH of 7 providing stability to all of said unstable vitamins.

2. A dry tablet of vitamin B-complex comprising in combination essentially, and in intimate admixture, a large quantity of amphoteric milk protein having an isoelectric point below pH of 7 and upwardly from pH of 6 in the base of the tablet, and small quantities of vitamins of the B-complex including at least one which is unstable in alkaline surroundings and selected from the group consisting of thiamin, riboflavin and a salt of pantothenic acid, and including free nicotinamide, the latter being characterized by instability and reversion to nicotinic acid form in a strongly acid medium of a character tending to stabilize said selected vitamin, said protein by its amphoteric character and buffering action at a pH from 6 to and under 7 providing stability to all of said unstable vitamins.

3. A dry tablet of vitamin B-complex comprising in combination essentially, and in intimate admixture, a large quantity of amphoteric milk protein having an isoelectric point below pH of 7 and upwardly from pH of 6 in the base of the tablet, a relatively small quantity of thiamin, and a relatively large quantity of free nicotinamide, said protein serving to stabilize the tablet at a pH slightly on the lower side of neutral pH of 7.

4. A dry tablet of vitamin B-complex comprising in combination essentially, and in intimate admixture, a large quantity of amphoteric milk protein having an isoelectric point below pH of 7 and upwardly from pH of 6 in the base of the tablet, a relatively small quantity of riboflavin, and a relatively large quantity of free nicotinamide, said protein serving to stabilize the tablet at a pH slightly on the lower side of neutral pH of 7.

5. A dry tablet of vitamin B-complex comprising in combination essentially, and in intimate admixture, a large quantity of amphoteric milk protein having an isoelectric point below pH of 7 and upwardly from pH of 6 in the base of the tablet, a relatively small quantity of salt of pantothenic acid, and a relatively large quantity of free nicotinamide, said protein serving to stabilize the tablet at a pH slightly on the lower side of neutral pH of 7.

6. A dry tablet of vitamin B-complex comprising in combination essentially, and in intimate admixture, a large quantity of amphoteric milk protein having an isoelectric point below pH of 7 and upwardly from pH of 6 in the base of the tablet, a relatively small quantity of dry vitamin substance selected from the group consisting of thiamin, riboflavin and salt of pantothenic acid, and a relatively large quantity of free nicotinamide, said protein serving to stabilize the tablet at a pH slightly on the lower side of neutral pH of 7.

7. A dry tablet of vitamin B-complex comprising in combination essentially, and in intimate admixture, a large quantity of amphoteric milk protein having an isoelectric point below pH of 7 and upwardly from pH of 6 in the base of the tablet, relatively small quantities of B-complex vitamins including salt of pantothenic acid, riboflavin and thiamin, and a relatively large quantity of free nicotinamide, said protein serving to stabilize the tablet at a pH slightly on the lower side of neutral pH of 7.

8. A dry tablet of vitamin B-complex comprising in combination essentially, and in intimate admixture, a large quantity of amphoteric milk protein having an isoelectric point below pH of 7 and upwardly from pH of 6 in the base of the tablet, relatively small quantities of B-complex vitamins including calcium salt of pantothenic acid, riboflavin and thiamin, and a relatively large quantity of free nicotinamide, said protein serving to stabilize the tablet at a pH slightly on the lower side of neutral pH of 7.

WALTER A. COMPTON.
RICHARD S. NICHOLLS.